United States Patent
Miryala et al.

(10) Patent No.: US 9,185,648 B2
(45) Date of Patent: Nov. 10, 2015

(54) INTELLIGENT BEACONING BY SOFTWARE-ENABLED ACCESS POINT

(71) Applicant: QUALCOMM Incorporated, San Diego, CA (US)

(72) Inventors: Sriman Miryala, Hyderabad (IN); Ashwani Dwivedi, Hyderabad (IN); Kiran Neelisetty, Hyderabad (IN); Ganesh Kondabattini, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 13/800,664

(22) Filed: Mar. 13, 2013

(65) Prior Publication Data

US 2014/0269463 A1 Sep. 18, 2014

(51) Int. Cl.
| | |
|---|---|
| *G08C 17/00* | (2006.01) |
| *H04W 52/02* | (2009.01) |
| *H04W 48/12* | (2009.01) |
| *H04W 84/12* | (2009.01) |
| *H04W 88/08* | (2009.01) |

(52) U.S. Cl.
CPC .......... *H04W 52/0216* (2013.01); *H04W 48/12* (2013.01); *H04W 84/12* (2013.01); *H04W 88/08* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,899,018 B2 | 3/2011 | Balasubramanian et al. | |
| 8,514,789 B2 * | 8/2013 | Akchurin et al. | 370/329 |
| 2003/0163579 A1 * | 8/2003 | Knauerhase et al. | 709/230 |
| 2004/0218620 A1 * | 11/2004 | Palm et al. | 370/445 |
| 2005/0154933 A1 | 7/2005 | Hsu et al. | |
| 2005/0174953 A1 * | 8/2005 | Ho | 370/310 |
| 2009/0003253 A1 | 1/2009 | Wang et al. | |
| 2009/0238133 A1 * | 9/2009 | Sakoda | 370/329 |
| 2010/0226309 A1 * | 9/2010 | Kasslin et al. | 370/328 |
| 2012/0026992 A1 | 2/2012 | Navda et al. | |
| 2012/0178429 A1 | 7/2012 | Camps et al. | |
| 2012/0195193 A1 | 8/2012 | Camps et al. | |
| 2013/0235813 A1 * | 9/2013 | Segev et al. | 370/329 |
| 2014/0105037 A1 * | 4/2014 | Manthiramoorthy | 370/252 |

FOREIGN PATENT DOCUMENTS

| | | |
|---|---|---|
| EP | 1463242 | 9/2004 |
| WO | 2011015370 | 2/2011 |
| WO | 2014039331 | 3/2014 |

OTHER PUBLICATIONS

Han H. et al., "DozyAP: Power-Efficient Wi-Fi Tethering," in Proceedings of MobiSys, 2012, pp. 421-434.
"International Application No. PCT/US2014/026088 International Search Report and Written Opinion", Jul. 10, 2014, 15 pages.
"PCT Application No. PCT/US2014/026088 International Preliminary Report on Patentability", May 28, 2015, 19 Pages.

\* cited by examiner

*Primary Examiner* — Michael J Moore, Jr.
(74) *Attorney, Agent, or Firm* — DeLizio Law, PLLC (57) ABSTRACT

Methods and systems according to embodiments of the present disclosure provide intelligent transmission of beacons by a SoftAP-enabled user device for minimizing power consumption. In an embodiment, a method comprises transmitting a first beacon from the SoftAP to a station connected to the SoftAP. The method also comprises determining a beacon interval between the first beacon and a second beacon. The method further comprises dynamically changing the beacon interval. And the method also comprises transmitting the second beacon upon the changed beacon interval passing since the transmitting of the first beacon.

28 Claims, 4 Drawing Sheets

INTELLIGENT BEACONING BY SOFTWARE-ENABLED ACCESS POINT

TECHNICAL FIELD

This disclosure generally relates to communication systems, and more particularly, to intelligent beaconing in wireless communication systems.

BACKGROUND

Currently, most user devices (e.g., mobile devices such as smart phones, tablets, cellular phones, laptops, etc.) support searching for and connecting to wireless communication systems such as Wi-Fi networks via hotspots, i.e., Wi-Fi network access points or areas. A Wi-Fi network access point, in general, may work as an Access Point (AP) for network connections.

In contrast, a set of user devices may establish an ad-hoc wireless network where a user device having a Software-enabled Access Point (SoftAP) may be used to provide a wireless client antenna that may act as both an Access Point and a client in the ad-hoc network. That is, SoftAP may act as "virtual" Wi-Fi such that software in a user device may enable the user device to create a hotspot or portable hotspot that other user devices in the vicinity may be able to use.

As such, SoftAP may enable a user device, for example, one having a wireless client antenna and network connection, as an Access Point (AP) to serve other user devices that may not otherwise have a network connection. When user devices, which may not have network (e.g., Internet) access directly, are in the vicinity or neighborhood of a SoftAP user device, those neighboring user devices may connect to a network through the user device having SoftAP functionality. It should be noted that in this disclosure, a SoftAP user device may be referred to as a Service Access Point or "SoftAP". Also, a user device that may connect to a network through a SoftAP may be referred to as a station (STA).

SoftAP user devices generally have capabilities to use the IEEE defined 802.11 groups of protocols (e.g., 802.11a, b, c, g, n, ac, etc.), and may be any fixed, mobile, or portable user device (e.g., smart phones, tablets, cellular phones, laptops, etc.).

Most use cases of SoftAP are generally limited to a small number of stations (STAs), for example, one or two STAs. One particular aspect in which SoftAP differs from a commercial AP is that for SoftAP, there may not be a need to repeat beaconing continuously to advertise its capabilities. For a commercial access point (AP), for example, in a corporate network or a shopping mall, any user device can try to connect to a network via the commercial AP. As such, the commercial AP generally may need to continue beaconing even if there are no STAs connected.

Because user devices may be the source of a Wi-Fi hotspot, it is commonly desirable that power consumption be minimized as much as possible (especially in mobile devices, for example). However, IEEE standards may not specify power save processes for user devices working in AP mode. As such, in cases where a user device is acting as a hotspot or a SoftAP, the user device may not go into power save mode, which may result in quicker draining of the battery.

SUMMARY

According to one or more embodiments of the present disclosure, systems and methods are provided for reducing power consumption of a SoftAP enabled user device in a wireless communications system.

According to an embodiment, a method comprises transmitting a first beacon from the SoftAP to a station connected to the SoftAP. The method also comprises determining a beacon interval between the first beacon and a second beacon. The method further comprises dynamically changing the beacon interval. And the method also comprises transmitting the second beacon upon the changed beacon interval passing since the transmitting of the first beacon.

BRIEF DESCRIPTION OF THE DRAWINGS

Like element numbers in different figures represent the same or similar elements.

DETAILED DESCRIPTION

Systems and methods for intelligent beaconing by a SoftAP user device that results in power savings are provided according to one or more embodiments of the present disclosure. In embodiments herein, an intelligent connection-based beaconing that helps to reduce power consumption on SoftAP is provided such that unnecessary transmission of beacons may be avoided. For example, in cases where a user device turns on SoftAP and, for instance, the user device gets disconnected after some time or the user forgets to turn off the hotspot or SoftAP feature, the beaconing may be stopped, and the beaconing may be started dynamically based on a connection. Thus, the user device avoids continuing to beacon, saving the battery of the user device.

In a current example, beacons may be transmitted at a basic rate of 1 Mbps, which may use baseband modulations of differential binary phase shift keying (DBPSK). Therefore, reducing the number of beacons transmitted may save significant battery power for user devices, e.g., mobile devices.

Figure 1:
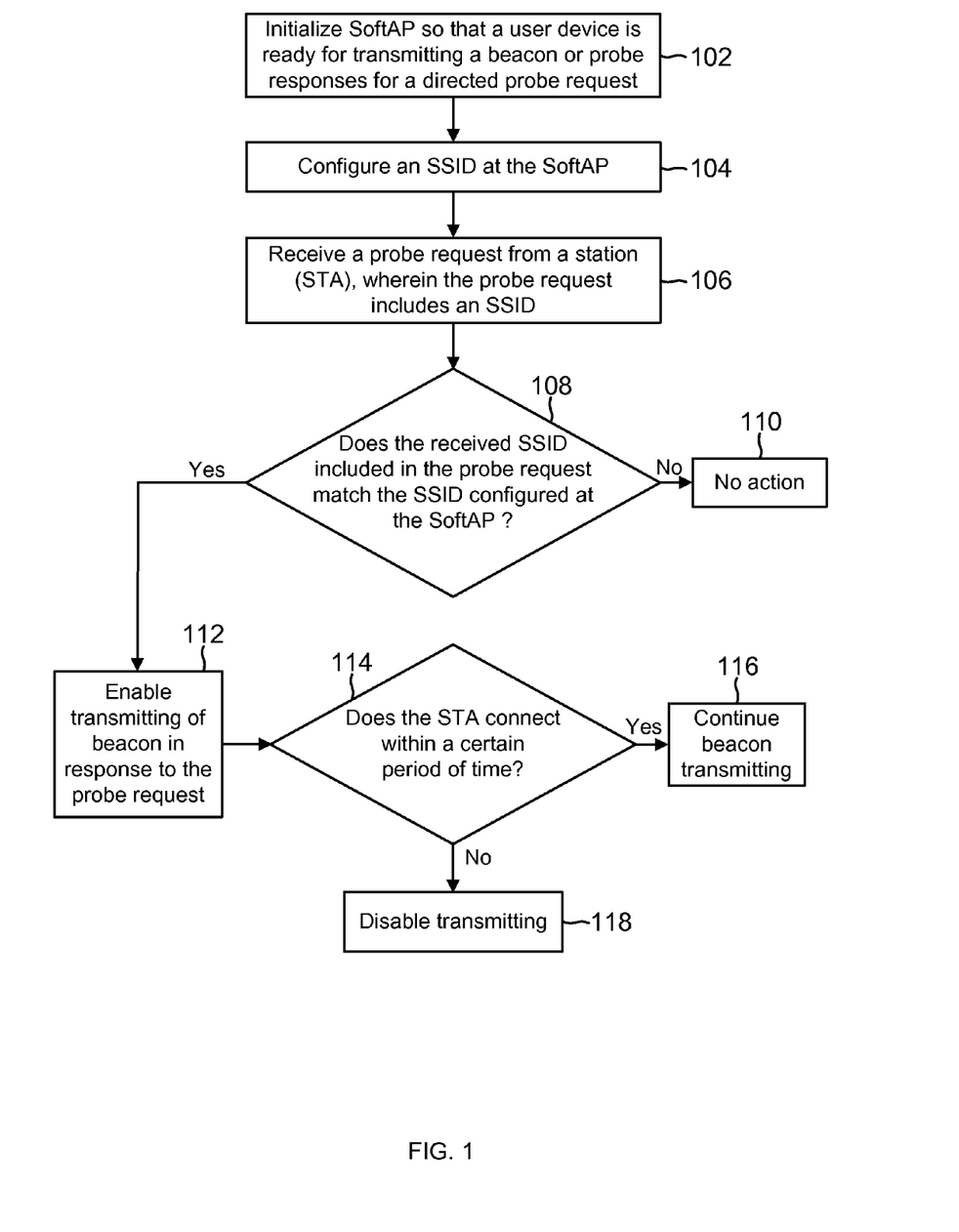
FIG. 1 is a flow diagram illustrating a method for intelligent beaconing in idle scenarios according to an embodiment of the present disclosure.
Figure 2:
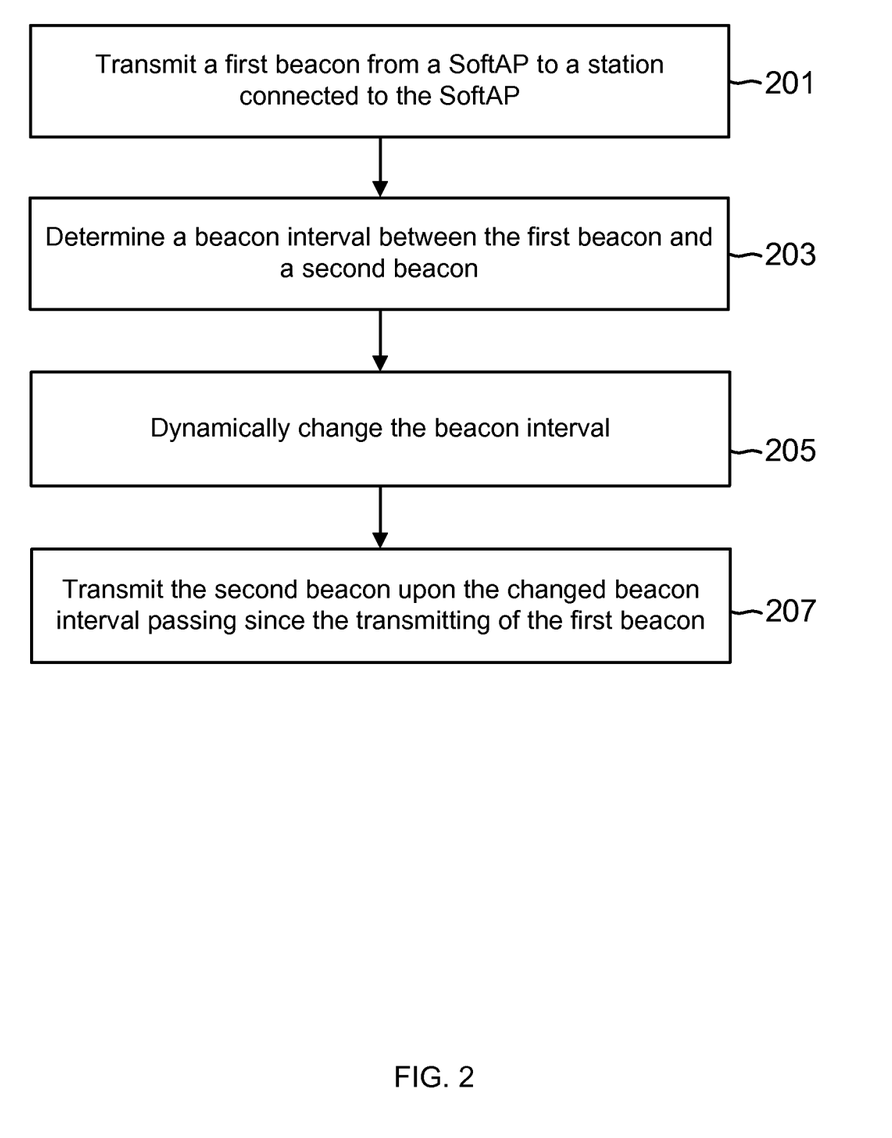
FIG. 2 is a flow diagram illustrating a method for intelligent transmission of beacons according to an embodiment of the present disclosure.
Figure 2A:
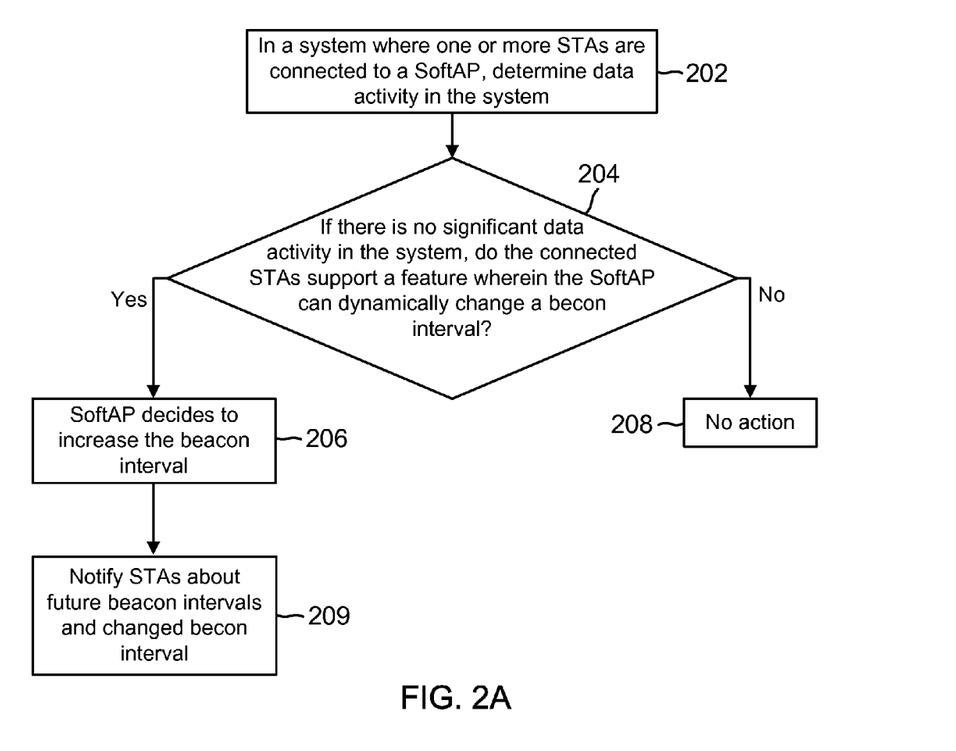
FIG. 2A is a flow diagram illustrating a method for intelligent beaconing in connected scenarios according to an embodiment of the present disclosure.

According to one or more embodiments, transmission of beacons by a SoftAP may be dynamically enabled or disabled so that power consumption is reduced. For example, FIG. 1 is a flow diagram illustrating a method for intelligent transmission of beacons in idle scenarios. In an embodiment, the transmission of beacons may be disabled in idle scenarios or states, for example, when no STAs are connected to a SoftAP. FIG. 2 is a flow diagram of a method for intelligent transmission of beacons according to an embodiment of the present disclosure. FIG. 2A is a flow diagram illustrating a method for intelligent transmission of beacons in connected scenarios, for example, when the SoftAP is idle with connected STAs. In various embodiments, the method illustrated in the embodiment of FIG. 2A may be an implementation of the method illustrated in the embodiment of FIG. 2.

Referring to FIG. 1, a flow diagram illustrates a method for intelligent beaconing in idle scenarios according to an embodiment of the present disclosure. In idle scenarios, there are no STAs connected to the SoftAP.

In block 102, when SoftAP features of a user device are enabled, the user device is prepared or ready for transmitting beacons or for probing responses for a directed probe request (in some embodiments, the user device may not transmit beacons at this point).

In block 104, an identifier, such as a Service Set Identifier (SSID), is configured at the SoftAP. In block 106, if a user device or station (STA) wants to connect to the SoftAP, it may send a probe request that includes an identifier (e.g., a unicast SSID). In an example, an STA that wants to connect to the SoftAP or hotspot may have previously asked for (or it may already know) the SSID configured at the SoftAP. In one or more embodiments, the SoftAP may provide its SSID to known STAs with which it may want to connect.

In block 108, continuing with the example of a unicast SSID, the received unicast SSID included in the probe request is compared with the SSID configured at the SoftAP. In block 110, if the probe request with the unicast SSID does not match the SSID configured at the SoftAP, there is no action (e.g., there is no beacon transmission). In block 112, if the probe request with the unicast SSID matches the SSID configured at the SoftAP, then the SoftAP may enable beaconing, after responding with a probe response, because there is a user device interested in connecting via the SoftAP. In block 114, after the SoftAP starts beaconing based on the unicast SSID probe request, it may wait for the STA to connect. In an embodiment, the SoftAP may start a timer at this point to measure or keep track of the waiting time for the STA to connect. In an embodiment where the timer runs out, the SoftAP may stop beacon transmission.

In block 116, if the STA connects (in one embodiment, within a specified period of time, e.g., within 5 seconds as measured by the timer), the SoftAP may continue beaconing. In block 118, if no user device or STA connects to the SoftAP, the SoftAP may stop, pause or disable transmitting (e.g., stop beaconing after a specified trigger such as after a specified period of time). The SoftAP may resume beaconing after it receives another probe request with a unicast SSID that matches the SSID configured at the SoftAP.

In an embodiment, for an idle scenario, a processor of the user device acting as a SoftAP (e.g., a mobile application processor (APPS processor)) may go into a suspended state if there is no need to respond to every probe request. In some embodiments, a connectivity processor of the user device acting as the SoftAP may wake up the APPS processor only when it receives a probe request including an identifier that matches the identifier configured at the SoftAP.

In various embodiments, the beacons generated by the SoftAP may contain the hidden SSID. In this manner, the power consumption is reduced because there is no beacon transmission in idle scenarios.

Referring now to FIG. 2, a flow diagram illustrates a method for intelligent transmission of beacons according to an embodiment of the present disclosure. According to one or more embodiments, intelligent transmission of beacons by a SoftAP enabled user device may be provided for minimizing power consumption. In block 201, a first beacon may be transmitted from the SoftAP to a station connected to the SoftAP. In block 203, a beacon interval may be determined between the first beacon and a second beacon. In block 205, the beacon interval may be dynamically changed. For example, the beacon interval may be increased in cases where the system determines that there is no significant data activity as will be described in more detail below. In block 207, the second beacon may be transmitted upon the changed beacon interval passing since the transmitting of the first beacon.

Referring now to FIG. 2A, a flow diagram illustrates a method for intelligent beaconing in connected scenarios according to an embodiment of the present disclosure. In connected scenarios, one or more STAs may be connected to a SoftAP such that power consumption may be minimized when the SoftAP is idle with STA's connected to it. The method illustrated in FIG. 2A may be one implementation of the method illustrated in FIG. 2 according to one or more embodiments.

In block 202, in a system (e.g., in a Basic Service Set (BSS)) where one or more STAs are connected to a SoftAP, data activity may be determined in the system, for example, there may be high data activity such that connections are active between the SoftAP and the STAs. There may be low or no significant data activity, for example, when no connections are made between the SoftAP and the STAs within a specified period of time such as 10 seconds. It should be appreciated that various techniques may be used to identify and measure data activity (or inactivity) associated with a communications system, for example, data activity may be based on beacon transmissions in the communications system. In some implementations, for example, a user device may monitor whether it has transmitted successive beacons for a defined period of time (for example, one and a half minutes). Also, in some implementations, a user device may monitor the amount of time that has passed or the number of beacon intervals that have occurred since the user device last received a beacon from another user device.

In block 204, if there is no significant data activity in the system, it is determined if the connected STAs support a feature wherein the SoftAP may dynamically change a beacon interval. In block 208, where connected STAs do not support the feature wherein a SoftAP can dynamically change the beacon interval, there is no action. In this case, for example, transmission of beacons may continue. In block 206, where connected STAs may support the feature wherein the SoftAP may dynamically change a beacon interval, the SoftAP may do so, that is, dynamically change a beacon interval based on data activity in the Basic Service Set (BSS), which includes the SoftAP and associated STAs. For example, SoftAP may dynamically increase the beacon interval when there is no significant data activity in the BSS. In one or more embodiments, the beacon intervals may be changed, e.g., increased, by various appropriate ways including, for example, by determining a beacon transmission time period, a step size that changes (e.g., increases) over time statically or dynamically, or by any other appropriate way. In one instance, if a beacon interval is normally 1 beacon per 100 ms, the beacon interval may be changed to 1 beacon per 200 ms or 300 ms if there is no significant data activity in the system. In another instance, a time period between beacons or a step of a beacon interval may increase gradually over time. A step may increase statically or it may increase dynamically over time. For example, a step may increase dynamically, e.g., a step may increase from 1 ms to 3 ms, to 4 ms, etc., or the step may increase statically over time such that a step increase is the same over time (e.g., a step may increase by 1 ms each time such as from 1 ms to 2 ms to 3 ms, etc.). A step may increase exponentially, arithmetically, or in any appropriate manner based on data activity in the system.

In block 209, the SoftAP may decide to increase the beacon interval and also notify STAs about future beacon intervals as well as a changed beacon interval. In various embodiments, an information element (i.e., an IE) may be added for use by SoftAP in the beacons to notify its client or associated STAs about a future beacon interval it is going to use, for example after 5 beacons. That is, when a beacon includes an IE, the transmitting beacon that includes the IE may indicate that the beacon interval will change, for example, after 2 beacons, and indicate that the beacon interval will change from 1 beacon per 100 ms to 1 beacon per 300 ms instead. The increment may be in integral multiples of the current beacon interval so that all client STAs may receive the beacons that are sent at new intervals. As such, client STAs may be able to adapt to the new beacon interval without having to start reconnection procedures.

Advantageously, some embodiments of the present disclosure increase security because, for example, the user device acting as SoftAP may not be a commercial enterprise or the like, so it is not required to allow connections to unknown STAs. As such, beaconing on demand may provide security in a way that allows connections only to STAs that know the identifier, e.g., the SSID, configured at the SoftAP.

Furthermore, power consumption is minimized to a large extent when the user device acting as SoftAP is idle with no STAs connected to it because a processor such as an APPS processor may go into power suspend in this mode. Power consumption may also be minimized when the user device acting as SoftAP is idle with STA's connected to it.

In various embodiments, where a SoftAP is enabled and this is the only AP at a location, an STA may not be able to connect to the SoftAP if the SoftAP is not beaconing. In this case, the SoftAP may do periodic scanning to find potential APs for STAs in the location. If there are APs in the location, the SoftAP may move to the intelligent beaconing as described above according to one or more embodiments. Otherwise, the SoftAP may fall back to a legacy beaconing.

Figure 3:
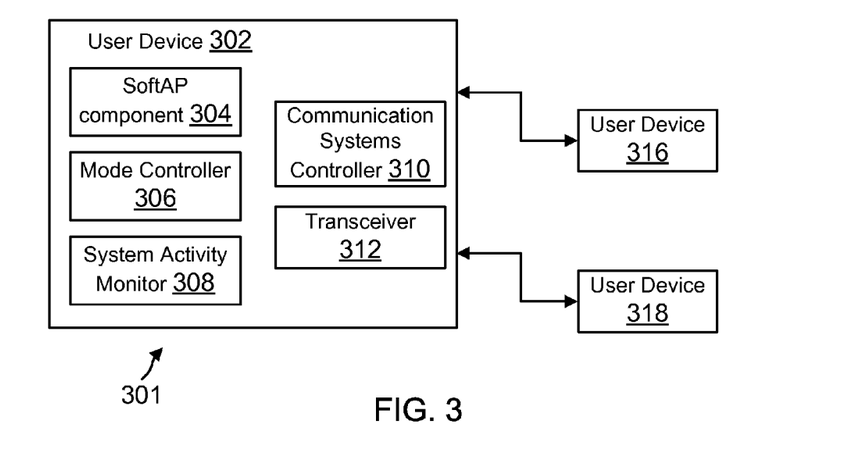
FIG. 3 is a block diagram of a communications system according to an embodiment of the present disclosure.

Referring now to FIG. 3, a block diagram of a communications system is illustrated according to an embodiment of the present disclosure. It should be noted that the communications system illustrated in FIG. 3 may be used to implement the methods illustrated above with respect to the embodiments of FIGS. 1 and 2.

A communications system 301 may generally include, for example, a wireless communications system such as an ad-hoc Wi-Fi network. System 301 may comprise a plurality of user devices 302, 316 and 318. In this embodiment, user device 302 may communicate with user devices 316 and 318 (also referred to as stations or "STAs"). It should be appreciated that system 301 may comprise any combination and/or number of user devices according to one or more embodiments.

User device 302 may comprise several components including for example, a SoftAP component 304, a mode controller 306, a system activity monitor 308, a communications system controller 310 and a transceiver 312. Although components 304-312 are only illustrated for user device 302, it should be noted that user devices 316 and 318 may include similar components.

SoftAP component 304 may include features for establishing an access point that may be activated to act as a "virtual" network connection such that software in the user device may enable the user device to create a hotspot or portable hotspot that other user devices, e.g., user devices 316 and 318, in the vicinity may be able to use. As such, SoftAP component 304 may enable user device 302 as an Access Point (AP) to serve user devices 316 and 318, which may not otherwise have a network connection.

Mode controller 306 may control a mode of operation of user device 302. For example, mode controller 306 may control whether one or more components of user device 302 operate in an active state (e.g., a fully operational mode), or a power save state (e.g. power savings mode). For example, user device 302 may operate in a power save state in idle scenarios where no STAs are connected to user device 302, or in idle scenarios where STAs are connected to it as described above according to one or more embodiments.

System Activity Monitor 308 may monitor activity associated with the communications system 301. In one or more embodiments herein, activity may relate to data or operations of user device 302 and/or operations of user devices 316 and 318. In an embodiment, data activity in communications system 301 may be monitored such that a determination may be made for changing a beacon interval as described above, for example, in connection with FIG. 2 according to one or more embodiments.

Communications System Controller 310 may provide appropriate functionality for establishing communications with one or more user devices via a network such as communications system 301. For example, controller 310 may provide functionality relating to enabling or disabling transmission of beacons, receiving probe requests including an identifier that is compared with an identifier configured at the user device, notifying of beacon interval changes or future interval changes, etc.

Transceiver 312 may provide appropriate functionality for establishing communications with one or more user devices via an appropriate medium, for example, a wireless medium. Transceiver 312 may comprise one or more transmitters and one or more receivers for communicating in communications system 301 and or other types of systems or networks.

It will be appreciated that the methods and systems disclosed herein may be implemented by or incorporated into a wide variety of electronic systems or devices. For example, a smart phone, a cell phone, a laptop, a tablet PC, etc. may include SoftAP features in accordance with one or more embodiments of the present disclosure. Other exemplary electronic systems such as a music player, a video player, a communication device, or a personal computer may also be configured with SoftAP features in accordance with one or more embodiments of the present disclosure.

Figure 4:
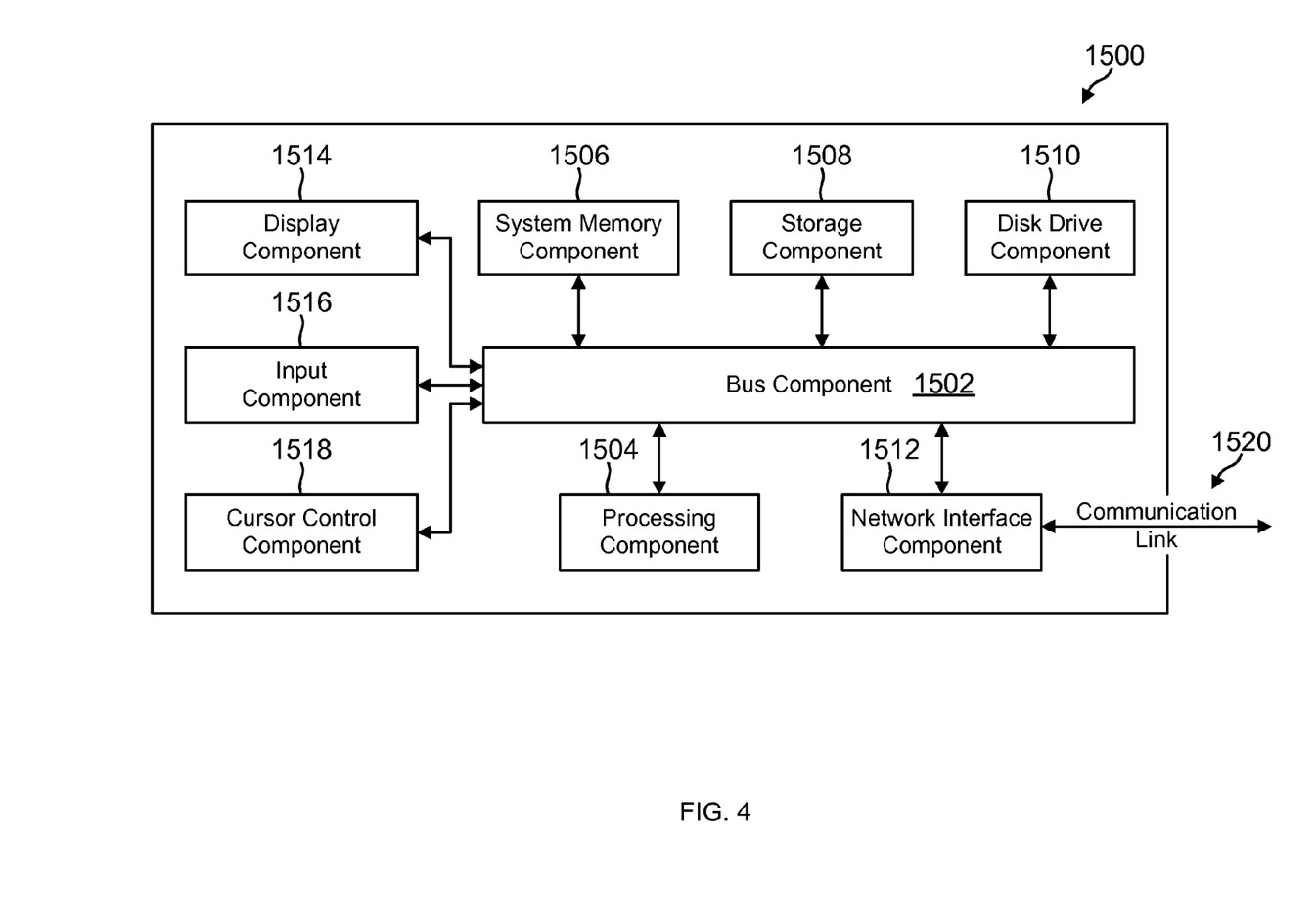
FIG. 4 is a block diagram of a system for implementing a device according to an embodiment of the present disclosure.

Referring now to FIG. 4, a block diagram of a system for implementing a device is illustrated according to an embodiment of the present disclosure.

In this regard, a system 1500 may be used to implement any type of device including wired or wireless devices such as a mobile device, a smart phone, a Personal Digital Assistant (PDA), a tablet, a laptop, a personal computer, a TV, a network server, or the like.

System 1500 may be suitable for implementing embodiments of the present disclosure, such as a part of a user device, including, for example, user devices 302, 316 and 318 illustrated in FIG. 3. System 1500 includes a bus 1502 or other communication mechanism for communicating information, which interconnects subsystems and components, including one or more of a processing component 1504 (e.g., processor, micro-controller, digital signal processor (DSP), an APPS processor, a connectivity processor, etc.), a system memory component 1506 (e.g., RAM), a static storage component 1508 (e.g., ROM), a network interface component 1512, a display component 1514 (or alternatively, an interface to an external display), an input component 1516 (e.g., keypad or keyboard, touch screen, etc.), and a cursor control component 1518 (e.g., a mouse pad).

In accordance with embodiments of the present disclosure, system 1500 performs specific operations by processing component 1504 executing one or more sequences of one or more instructions contained in system memory component 1506. Such instructions may be read into system memory component 1506 from another computer readable medium, such as static storage component 1508. These may include instructions for intelligent transmission of beacons by a SoftAP as well as, for example, configuring identifiers associated with a SoftAP, changing of beacon intervals, notifying of changed beacon intervals, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processing component 1504 for execution. Such a medium may take many forms, including but not limited to, non-volatile media, volatile media, and transmission media. In various implementations, volatile media includes dynamic memory, such as system memory component 1506, and transmission media includes coaxial cables, copper wire, and fiber optics, including wires that comprise bus 1502. In an embodiment, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read. The computer readable medium may be non-transitory.

In various embodiments of the disclosure, execution of instruction sequences to practice the disclosure may be performed by system 1500. In various other embodiments, a plurality of systems 1500 coupled by communication link 1520 (e.g., Wi-Fi antenna(s), or various other wired or wireless networks) may perform instruction sequences to practice the disclosure in coordination with one another. System 1500 may transmit and receive beacons, messages, data, information and instructions, including one or more programs (i.e., application code) through communication link 1520 and network interface component 1512. Received program code may be executed by processing component 1504 as received and/or stored in disk drive component 1510 or some other non-volatile storage component for execution.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for beaconing by a Software enabled Access Point (SoftAP), comprising:
   transmitting, in accordance with a first beacon interval, a first beacon from the SoftAP to a station;
   dynamically determining to change the first beacon interval to a second beacon interval; and
   transmitting, by the SoftAP in accordance with the first beacon interval, a second beacon including an indication that the first beacon interval will be changed to the second beacon interval after transmission of one or more beacons using the first beacon interval.

2. The method of claim 1, wherein the indication that the first beacon interval will be changed to the second beacon interval is included in an information element of the second beacon.

3. The method of claim 1, wherein dynamically changing the first beacon interval comprises dynamically increasing the first beacon interval by an amount of time, wherein the amount of time is based, at least in part, on a data activity to and from the SoftAP.

4. The method of claim 1, wherein dynamically changing the first beacon interval comprises dynamically increasing the first beacon interval by a first fixed amount of time.

5. The method of claim 4, further comprising:
   increasing the second beacon interval by the first fixed amount of time to determine a third beacon interval; and
   transmitting an indication that the second beacon interval will be changed to the third beacon interval after transmission of one or more beacons using the second beacon interval.

6. The method of claim 4, further comprising:
   increasing the first fixed amount of time by a first value to determine a second fixed amount of time;
   increasing the second beacon interval by the second fixed amount of time to determine a third beacon interval; and
   transmitting an indication that the second beacon interval will be changed to the third beacon interval after transmission of one or more beacons using the second beacon interval.

7. The method of claim 6, further comprising:
   increasing the second fixed amount of time by a second value to determine a third fixed amount of time, wherein the second value is an integer multiple of the first value;
   increasing the third beacon interval by the third fixed amount of time to determine a fourth beacon interval; and
   transmitting, in accordance with the fourth beacon interval, a fourth beacon including an indication that the third beacon interval will be changed to the fourth beacon interval after transmission of one or more beacons using the third beacon interval.

8. A user device, comprising:
   one or more processors; and
   one or more memories to store a plurality of machine-readable instructions which, when executed by the one or more processors, cause the user device to act as a Software enabled Access Point (SoftAP), the SoftAP configured to:
   transmit, in accordance with a first beacon interval, a first beacon from the user device to a station;
   dynamically determine to change the first beacon interval to determine a second beacon interval; and
   transmit, by the SoftAP in accordance with the first beacon interval, a second beacon including an indication that the first beacon interval will be changed to the second beacon interval after transmission of one or more beacons using the first beacon interval.

9. The user device of claim 8, wherein the indication that the first beacon interval will be changed to the second beacon interval is included in an information element of the second beacon.

10. The user device of claim 8, wherein the SoftAP is further configured to, when dynamically changing the first beacon interval, dynamically increase the first beacon interval by an amount of time, wherein the amount of time is based, at least in part, on a data activity to and from the user device.

11. The user device of claim 8, wherein the SoftAP is further configured to, when dynamically changing the first beacon interval, increase the first beacon interval by a first fixed amount of time.

12. The user device of claim 11, wherein the SoftAP is further configured to increase the second beacon interval by the first fixed amount of time to determine a third beacon interval, and transmit an indication that the second beacon interval will be changed to the third beacon interval after transmission of one or more beacons using the second beacon interval.

13. The user device of claim 11, wherein the SoftAP is further configured to:
increase the first fixed amount of time by a first value to determine a second fixed amount of time;
increase the second beacon interval by the second fixed amount of time to determine a third beacon interval; and
transmit an indication that the second beacon interval will be changed to the third beacon interval after transmission of one or more beacons using the second beacon interval.

14. The user device of claim 13, wherein the SoftAP is further configured to:
increase the second fixed amount of time by a second value to determine a third fixed amount of time, wherein the second value an integer multiple of the first value;
increase the third beacon interval by the third fixed amount of time to determine a fourth beacon interval; and
transmit an indication that the third beacon interval will be changed to the fourth beacon interval after transmission of one or more beacons using the third beacon interval.

15. The user device of claim 8, wherein the user device is a mobile device.

16. A non-transitory computer readable medium on which are stored computer readable instructions which, when executed by a processor of a device, cause the device to:
transmit a first beacon from the device acting as a Software enabled Access Point (SoftAP) to one or more stations in communication with the device acting as a SoftAP;
determine, based at least in part on the first beacon, a first beacon interval;
determine, based at least in part on current data activity of the one or more stations in communication with the device acting as a SoftAP, a second beacon interval;
dynamically change the first beacon interval to the second beacon interval; and
transmit a second beacon to the one or more stations in accordance with the first beacon interval, wherein the second beacon includes an indication that the first beacon interval will be changed to the second beacon interval after transmission of one or more beacons using the first beacon interval.

17. The non-transitory computer readable medium of claim 16, wherein the indication that the first beacon interval will be changed to the second beacon interval is included in an information element of the second beacon.

18. The non-transitory computer readable medium of claim 16, wherein the instructions to dynamically change the first beacon interval include instructions to dynamically increase the first beacon interval by a first fixed amount of time.

19. The non-transitory computer readable medium of claim 18, wherein the instructions which when executed by the processor cause the device further to:
increase the second beacon interval by the first fixed amount of time to determine a third beacon interval; and
transmit an indication that the second beacon interval will be changed to the third beacon interval after transmission of one or more beacons using the second beacon interval.

20. The non-transitory computer readable medium of claim 18, wherein the instructions which when executed by the processor cause the device further to:
increase the first fixed amount of time by a first value to determine a second fixed amount of time;
increase the second beacon interval by the second fixed amount of time to determine a third beacon interval; and
transmit an indication that the second beacon interval will be changed to the third beacon interval after transmission of one or more beacons using the second beacon interval.

21. The non-transitory computer readable medium of claim 20, wherein the instructions which when executed by the processor cause the device further to:
increase the second fixed amount of time by a second value to determine a third fixed amount of time, wherein the second value is an integer multiple of the first value;
increase the third beacon interval by the third fixed amount of time to determine a fourth beacon interval; and
transmit an indication that the third beacon interval will be changed to the fourth beacon interval after transmission of one or more beacons using the third beacon interval.

22. A user device, comprising:
one or more processors; and
one or more memories to store a plurality of machine-readable instructions which, when executed by the one or more processors, cause the user device to act as a Software enabled Access Point (SoftAP), the SoftAP configured to:
transmit a first beacon from the user device to one or more stations in communication with the user device;
determine, based at least in part on the first beacon, a first beacon interval;
determine, based on current data activity of the one or more stations in communication with the user device, a second beacon interval;
dynamically change the first beacon interval to the second beacon interval; and
transmit a second beacon to the one or more stations in accordance with the first beacon interval, wherein the second beacon includes an indication that the first beacon interval will be changed to the second beacon interval after transmission of one or more beacons using the first beacon interval.

23. The user device of claim 22, wherein the indication that the first beacon interval will be changed to the second beacon interval is included in an information element of the second beacon.

24. The user device of claim 22, wherein the SoftAP is further configured to, when dynamically changing the first beacon interval, increase the first beacon interval by a first fixed amount of time.

25. The user device of claim 24, wherein the SoftAP is further configured to increase the second beacon interval by the first fixed amount of time to determine a third beacon interval, and transmit an indication that the second beacon interval will be changed to the third beacon interval after transmission of one or more beacons using the second beacon interval.

26. The user device of claim 24, wherein the SoftAP is further configured to:
increase the first fixed amount of time by a first value to determine a second fixed amount of time;
increase the second beacon interval by the second fixed amount of time to determine a third beacon interval; and transmit an indication that the second beacon interval will be changed to the third beacon interval after transmission of one or more beacons using the second beacon interval.

27. The user device of claim 26, wherein the SoftAP is further configured to:
increase the second fixed amount of time by a second value to determine a third fixed amount of time, wherein the second value an integer multiple of the first value;
increase the third beacon interval by the third fixed amount of time to determine a fourth beacon interval; and
transmit an indication that the third beacon interval will be changed to the fourth beacon interval after transmission of one or more beacons using the third beacon interval.

28. An apparatus enabled to act as a software enabled Access Point (SoftAP), comprising;
means for transmitting, in accordance with a first beacon interval, a first beacon to one or more stations in communication with the apparatus;
means for dynamically determining to change the first beacon interval to a second beacon interval based on data activity of the one or more stations in communication with the apparatus; and
means for transmitting, by the apparatus in accordance with the first beacon interval, a second beacon; including an indication that the first beacon interval will be changed to the second beacon interval after transmission of one or more beacons using the first beacon interval.

* * * * *